United States Patent [19]

Spiker

[11] 4,098,061
[45] Jul. 4, 1978

[54] ROW-CROP HARVESTING ATTACHMENT

[76] Inventor: Quentin B. Spiker, 1107 MacVicar, Topeka, Kans. 66604

[21] Appl. No.: 721,798

[22] Filed: Sep. 8, 1976

[51] Int. Cl.² .................. A01D 41/00; A01D 45/22
[52] U.S. Cl. .................................. 56/124; 56/158
[58] Field of Search .............................. 56/219–226, 56/1, 122–125, 153, 157, 158

[56] References Cited
U.S. PATENT DOCUMENTS

| 2,327,864 | 8/1943 | Brogard et al. | 56/122 |
| 2,333,153 | 11/1943 | Crow | 56/1 |
| 2,492,881 | 12/1949 | Oehler et al. | 56/226 |
| 2,823,511 | 2/1958 | Beaty | 56/226 |
| 3,807,153 | 4/1974 | Barkstroma et al. | 56/226 |

Primary Examiner—Russell R. Kinsey
Attorney, Agent, or Firm—Fishburn, Gold & Litman

[57] ABSTRACT

A harvesting attachment for use in combination with a combine is particularly adapted for harvesting row-crops, such as beans and the like, and is adapted for mounting a plurality of same in spaced apart relation across the forward portion of a combine trough to accomodate the row spacing. The attachment is arranged for driving from the combine and includes a sickle bar mounted on a leading side of a lower portion of a housing and an endless conveyor extending from adjacent the sickel bar to adjacent a trailing side of the housing for moving vegetation into a forward portion of the combine. The row-crop harvesting attachment includes a reel mounted on the housing and positioned above and forwardly of the sickle bar and including a plurality of circumferentially spaced pick-up tines engageable with vegetation for moving same toward the sickle bar. The attachment includes a kicker rotatably mounted on the housing and positioned above the endless conveyor and adjacent a trailing side of the housing and having a plurality of circumferentially spaced vegetation engaging blades extending outwardly from the kicker for assisting the endless conveyor in moving the vegetation and discharge same to the combine trough to be further processed in the combine. The mounting of the attachment on the combine provides adjustment for cutting heights and also is arranged to permit the attachment to move over uneven ground.

9 Claims, 8 Drawing Figures

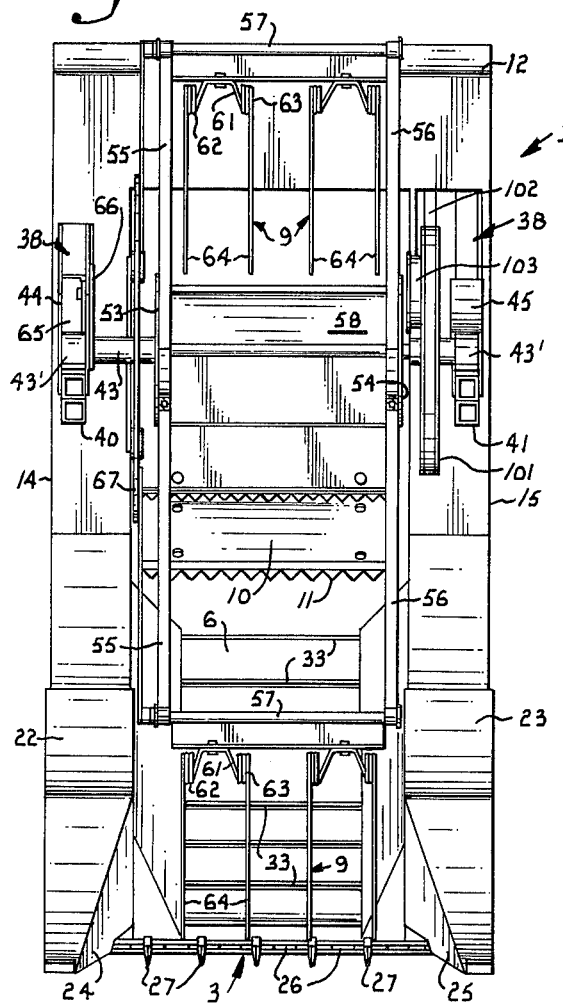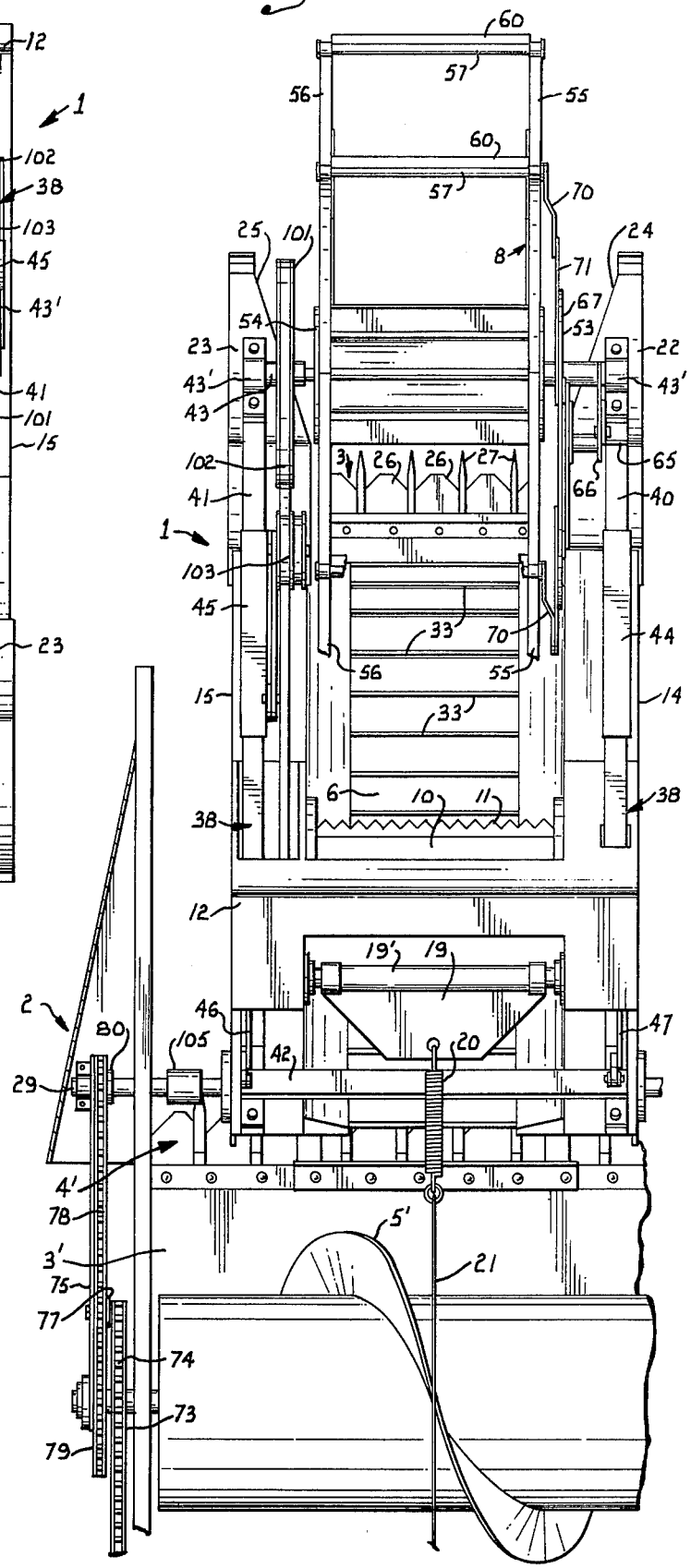

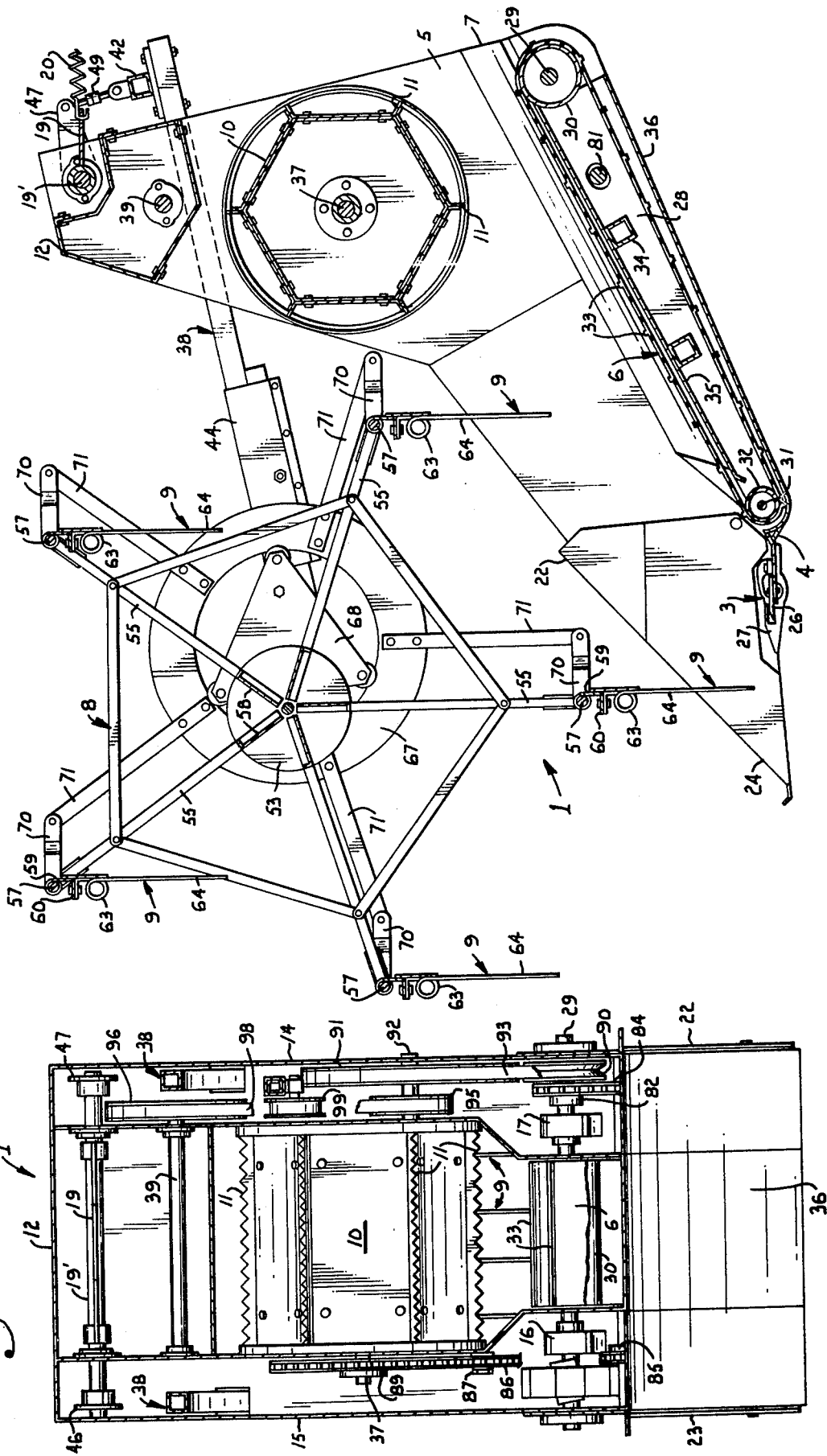

ROW-CROP HARVESTING ATTACHMENT

The present invention relates to a harvesting attachment for use in combination with a combine and more particularly, to a row-crop harvesting attachment adapted for harvesting row-crops, such as beans and the like.

The principal objects of the present invention are: to provide a row-crop harvesting attachment for use in combination with a combine and particularly adapted for harvesting row-crops, such as beans and the like; to provide such a harvesting attachment which is easy to install on a combine and requiring only removal of the combine reel and disconnection of the combine sickle for mounting; to provide such a row-crop harvesting attachment having a forward reel with circumferentially spaced tines each retained in a substantially vertical position during rotation of the forward reel for effecting movement of the vegetation toward a sickle of the harvesting attachment; to provide such a harvesting attachment having an endless conveyor for moving vegetation into a forward portion of the combine and a rotatably mounted drum with vegetation engaging blades operative to assist the endless conveyor in moving the vegetation; to provide such an attachment with connections to the combine that permit a floating action for movement over uneven ground; to provide such a row-crop harvesting attachment which is operatively connected to the drive means of the combine for driving operative parts of the harvesting attachment; and to provide such a harvesting attachment which is economical to manufacture, durable in construction, easy to install on the combine, positive in operation, and particularly well adapted for the proposed use.

Other objects and advantages of this invention will become apparent from the following description taken in connection with the accompanying drawings wherein are set forth, by way of illustration and example, certain embodiments of this invention.

The drawings constitute a part of the specification and include an exemplary embodiment of the present invention and illustrate various objects and features of the row-crop harvesting attachment.

FIG. 5 is an enlarged front elevational view of the one harvesting attachment with portions broken away to better illustrate the component parts.

FIG. 6 is an enlarged top plan view of one of the harvesting attachments with portions broken away to better illustrate the component parts.

FIG. 7 is an enlarged rear elevational view of the one harvesting attachment with portions broken away to better illustrate the component parts.

FIG. 8 is an enlarged longitudinal sectional view through one of the harvesting attachments.

As required, detailed embodiments of the present invention are disclosed herein, however, it is to be understood that the disclosed embodiments are merely exemplary of the invention which may be embodied in the various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Figure 1:
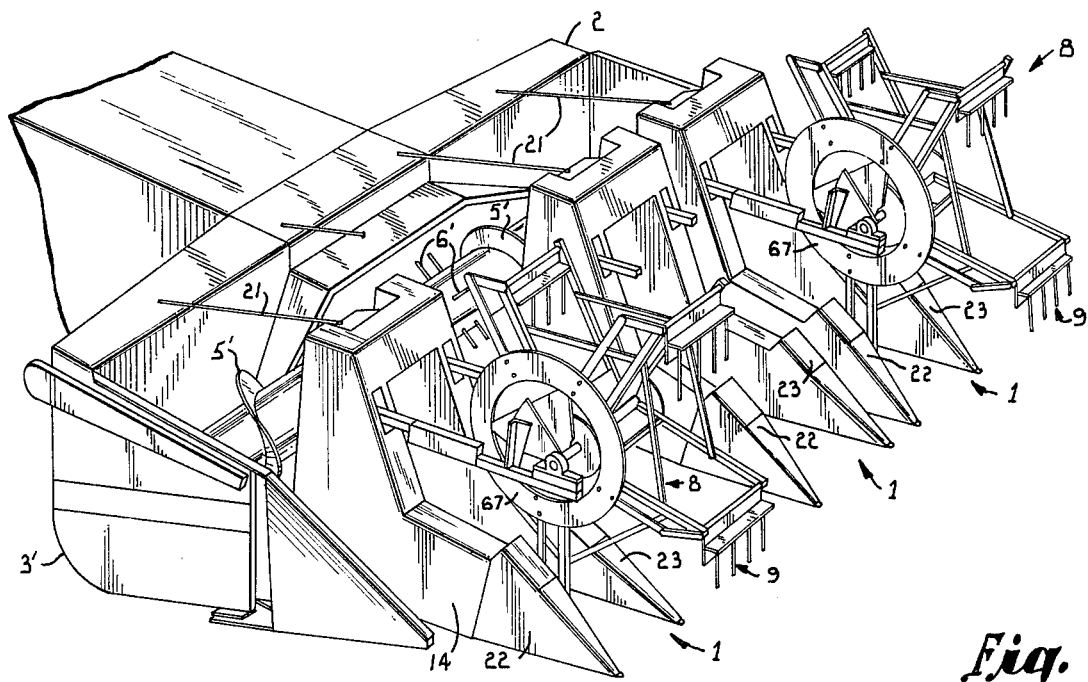
FIG. 1 is a fragmentary perspective view of a combine having mounted thereon a plurality of row-crop harvesting attachments each embodying features of the present invention.
Figure 2:
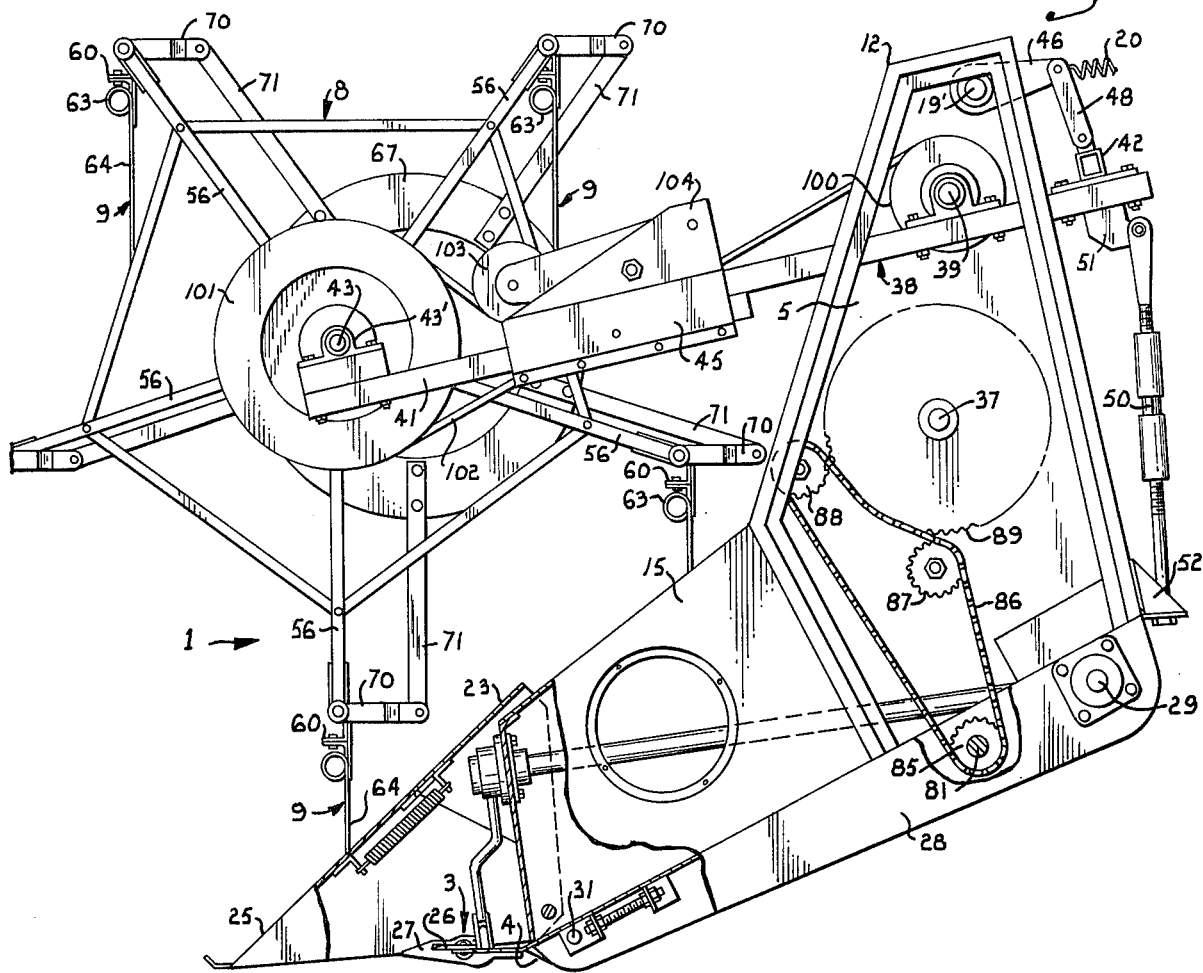
FIG. 2 is an enlarged side elevational view of a first side of one of the row-crop harvesting attachments with portions broken away to better illustrate the component parts of the harvesting attachment.
Figure 3:
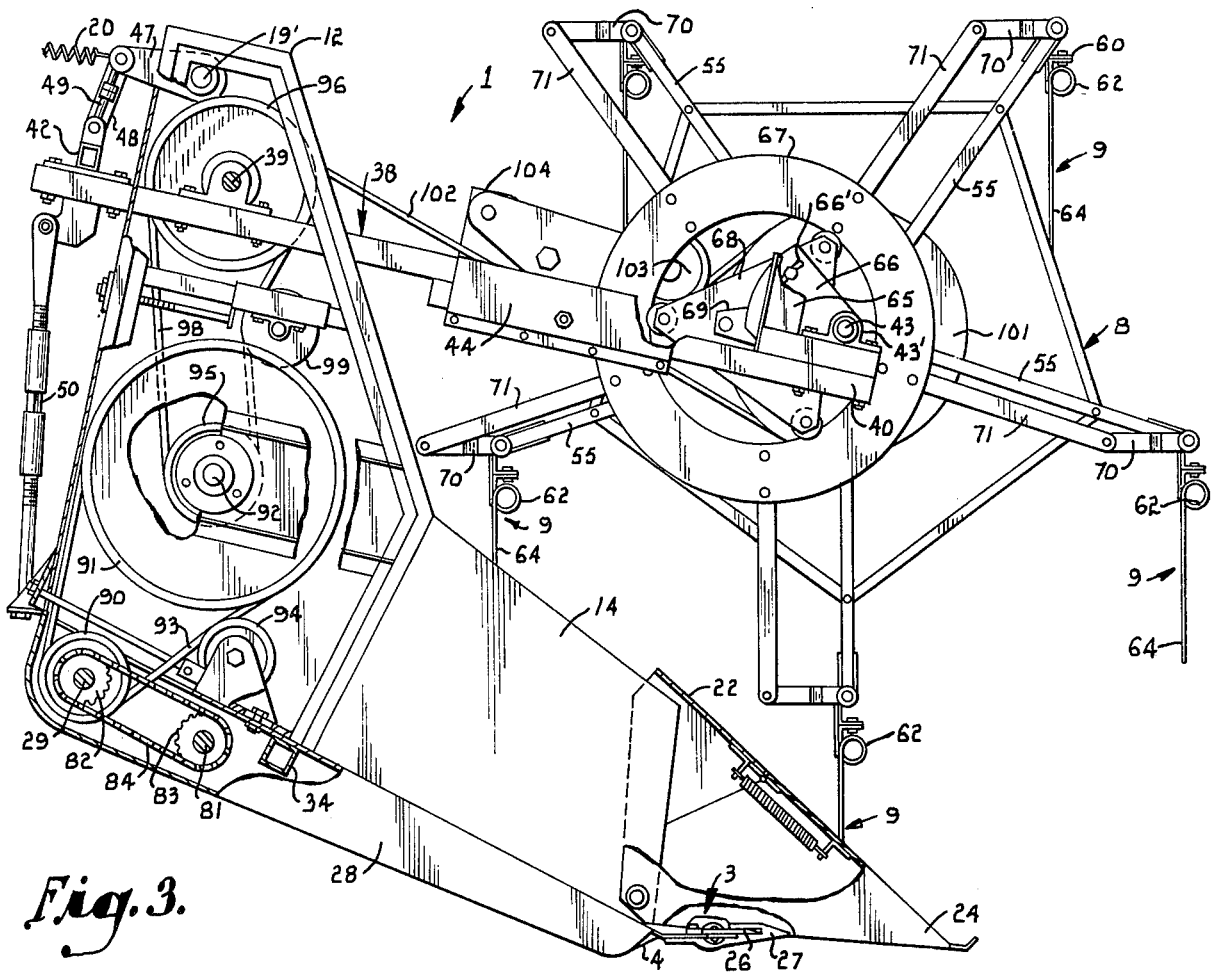
FIG. 3 is an enlarged side elevational view of a second side of the one harvesting attachment with portions broken away to better illustrate the component parts.
Figure 4:
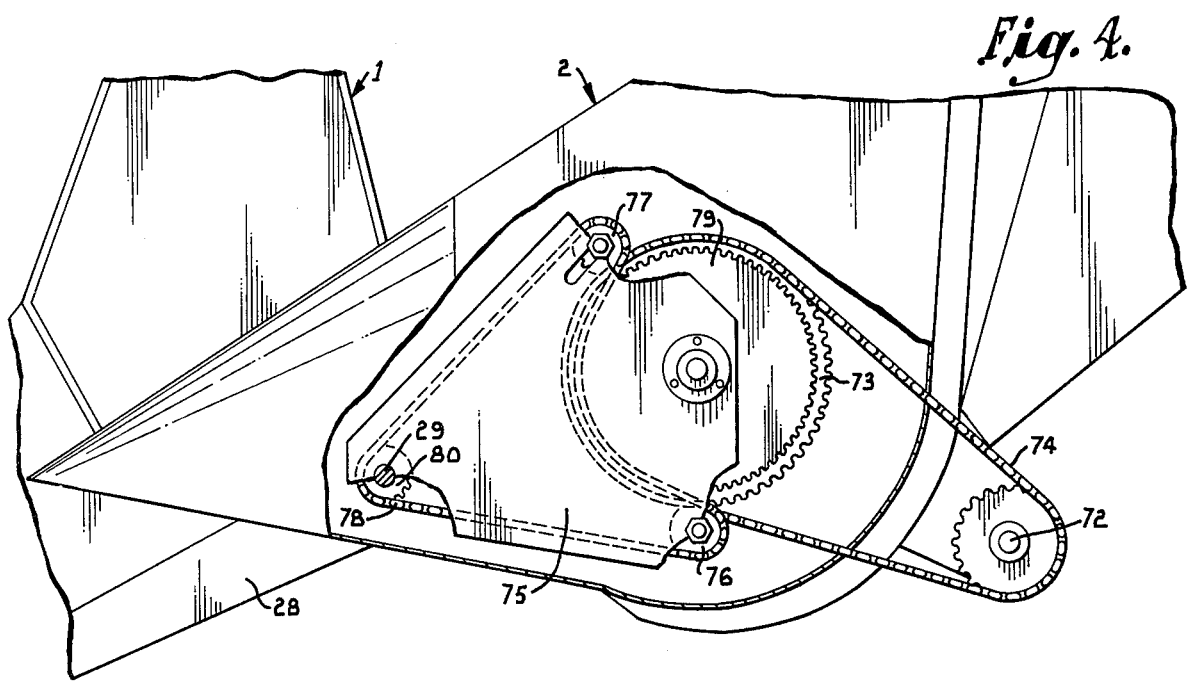
FIG. 4 is an enlarged fragmentary side elevational view of the combine showing the drive system for driving the harvesting attachments.

Referring more in detail to the drawings:

In the disclosed embodiment of the present invention, the reference numeral 1 designates generally a row-crop harvesting attachment for use in combination with a combine 2 and particularly adapted for harvesting row crops, such as beans and the like. The combine 2 shown in FIG. 1 is to represent a conventional combine as the attachment 1 may be arranged to to be mounted on and function with such combines. The combine 2 has a trough or pan 3' extending transversely of the path of the combine 2 in harvesting crops. The combine 2 normally has a sickle bar 4' at the forward portion of the trough 3' to cut the crop and a rotating reel (not shown) forwardly and upwardly of the sickle bar 4' with slats to engage and move the grain or crop into the trough 3' as it is cut. An auger 5' in the trough 3' rotates and moves the crop to a kicker portion 6' that moves the crop from the trough 3' through an opening into the threshing and separating portions of the combine to complete the harvesting of the crop.

The harvesting attachments 1 are adapted to be mounted at the forward portion of the trough 3' in spaced apart relation with one attachment for each row. The attachments 1 are mounted to be carried by the combine 2 with a floating action for movement over uneven ground. Also the operative parts of the attachment 1 are connected to the combine to be driven thereby so that when mounted and operative the combine operator can move to the combine cab and operate the combine and harvester to move through the field in a similar manner to that used in harvesting grain crops and the like except for directing the machine with attachments in alignment with the rows of the crop. The harvesting attachments 1 each have their own reels and sickles therefor. In mounting the harvesting attachments 1 on a combine 2, the combine reel (not shown) and sickle bar 4' are disconnected from drive mechanism therefor and the combine reel removed.

The harvesting attachment 1 includes vegetation cutting means in the form of a sickle bar 3 mounted on a leading side 4 of a lower portion of a frame or housing 5 and an endless conveyor 6 extending from adjacent the sickle bar 3 to adjacent a trailing side 7 of the frame or housing 5 for moving vegetation from adjacent the sickle bar 3 into a trough or pan 3' of the combine 2. The row-crop harvesting attachment 1 includes a reel 8 positioned above and forwardly of the sickle bar 3 and including a plurality of circumferentially spaced pick-up tines 9 engageable with vegetation for moving same toward the sickle bar 3. The attachment 1 includes a kicker 10 mounted on the housing 5 and positioned above the endless conveyor 6 and adjacent the trailing side 7 of the housing 5 and having a plurality of spaced vegetation engaging blades 11 extending outwardly and movable for assisting the endless conveyor 6 in moving vegetation into the combine 2.

The frame or housing 5 may be any suitable structure adapted to be mounted on a forward portion or trough 3' of the combine 2 and to support the operative components of the row-crop harvesting attachment 1. The illustrated housing 5 has an upper portion 12 and is bifurcated to define a vegetation passageway. Laterally spaced opposite side portions 14 and 15 depend from the upper portion 12. The rear side of the opposite side portion 14 and 15 define the trailing side 7 of the housing 5.

Brackets 16 and 17 are pivotally mounted on a shaft 29 and extend outwardly from a lower portion of the rear side 7 adjacent the opposite side portions 14 and 15 of the frame or housing 5 and are suitably mounted on the forward portion of the combine 2, as on a combine sickle bar 4' after same has been disconnected. The upper portion 12 of the housing 5 has a rotatably or hingedly mounted flange 19 extending from the trailing side 7. The flange 19 is suitably connected to the combine 2. In the illustrated embodiment, a resilient member 20 has one end thereof connected to the flange 19 and a flexible member 2 extends between and is connected to the other end of the resilient member 20 and to an upper portion of the combine housing whereby the harvesting attachment 1 is resiliently mounted on a forward portion of the combine 2. The pivotally mounted brackets 16 and 17 and the resilient member 20 cooperate to permit adjustment of the attachment 1 relative to the combine 2 and to permit a forward or leading portion of the attachment 1 to travel over uneven ground.

The opposite side portions 14 and 15 of the frame or housing 5 have forwardly extending portions 22 and 23 respectively. Toe portions 24 and 25 are pivotally mounted and resiliently supported on the forward end of the forwardly extending portions 22 and 23 respectively. The toe portions 24 and 25 are tapered from the forward end and enlarged inwardly and rearwardly to guide vegetation toward the sickle bar 3 and the endless conveyor 6.

The sickle bar 3 is mounted on the frame or housing 5 and is positioned adjacent the leading side 4 of the housing 5 and provides means for cutting vegetation between the toe portions 24 and 25. The sickle bar 3 extends between the toe portions 24 and 25 and includes a plurality of stationary blades 27 and a plurality of movable cutting blades 26, as is conventional. The movable cutting blades 26 may be driven in any suitable manner.

The frame or housing 5 includes a lower portion 28 extending between the lower portions of the opposite side portions 14 and 15 and the lower portion 28 is adapted to support thereon the endless conveyor 6. In the illustrated embodiment, a drive shaft 29 extends between and has opposite end portions thereof rotatably supported on the opposite side portions 14 and 15 and the drive shaft 29 is positioned adjacent the trailing side 7 of the housing 5. The drive shaft 29 also has the brackets 16 and 17 supported thereon, as in suitable bearings, so that the brackets 16 and 17 are pivotally mounted on the frame 5. A sleeve member 30 is mounted on the drive shaft 29 and is operative to drive the endless conveyor 6.

An idler shaft 31 extends between and has opposite end portions thereof rotatably mounted on the leading end of the forwardly extending portions 22 and 23. A sleeve member 32 is mounted on the idler shaft 31 and cooperates with the sleeve portion 30 on the drive shaft 29 to support an endless belt defining the endless conveyor 6. The endless belt is preferably formed of rubber and/or canvas and has a plurality of longitudinally spaced transversely extending rigs 33 preferably integral therewith and operative to move vegetation between the leading side 4 and the trailing side 7 of the housing 5.

It is desirable to provide support for the vegetation moving portion of the endless belt, therefore, the frame 5 includes a plurality of longitudinally spaced beams or struts 34 extending transversely between the opposite side portions 14 and 15 and the forwardly extending portions 22 and 23. A generally planar floor member 35 is supported on the beams or struts 34 and extends transversely between the opposite side portions 14 and 15 and the forwardly extending portions 22 and 23. The floor member 35 is positioned below the upper run of the endless belt and extends longitudinally between and has opposite edges thereof adjacent the sleeve members 30 and 32 on the drive and idler shafts 29 and 31 respectively.

It is also desirable to enclose the return or lower run of the endless belt, therefore, a generally planar bottom member 36 is positioned below the return or lower run of the endless belt and extends transversely between the lower edges of the forwardly extending portions 22 and 23 of the housing 5. The bottom member 36 extends longitudinally from adjacent the sleeve member 30 on the drive shaft 29 to around and forwardly of the sleeve member 32 on the idler shaft 31. The forward portion of the bottom member 36 also provides a support for the sickle bar 3.

The row-crop harvesting attachment 1 includes means mounted on the housing 5 and positioned above the endless conveyor 6 for assisting the endless conveyor 6 in moving vegetation. In the illustrated embodiment, the kicker 10 is mounted on a drum shaft 37 having opposite end portions thereof rotatably mounted on the opposite side portions 14 and 15 of the frame or housing 5. The kicker 10 is positioned above the endless conveyor 6 and between the reel 8 and the trailing side 7 of the frame or housing 5.

The kicker 10 is in the form of a drum having a plurality of the circumferentially spaced vegetation engaging members or blades 11 mounted thereon and extending radially outwardly from the periphery of the drum 10. Each of the blades 11 has a sawtooth free edge so that the blades 11 engage vegetation moving along the endless conveyor 6 and rotation of the drum 10 effects assistance in moving the vegetation towards the combine 2.

The harvesting attachment 1 includes means mounted on the housing 5 and positioned above the sickle bar 3 for moving vegetation toward the sickle bar 3. In the illustrated embodiment, the reel 8 is positioned above and forwardly of the sickle bar 3, and has a plurality of circumferentially spaced tines 9 engageable with vegetation for moving same towards the sickle bar 3. A frame 38 is mounted on the housing 5 and extends forwardly from the leading side 4 of the housing 5. The frame 38 is mounted on an elongated shaft 39 positioned adjacent or supported on the upper portion 12 of the housing 5 and extending between the opposite side portions 14 and 15 of the housing 5. The frame shaft 39 has opposite end portions thereof rotatably mounted, as in suitable bearings mounted on the opposite side portions 14 and 15 of the housing 5 whereby the frame may pivot about the axis of the frame shaft 39.

The illustrated frame 38 includes a pair of laterally spaced elongated frame members 40 and 41 mounted on the frame shaft 39 and extending forwardly and rearwardly from the housing 5. The frame 38 includes a tie or connection member 42 which is positioned in spaced relation with the trailing side 7 of the upper portion 12 of the housing 5. The tie member 42 extends between and has opposite ends thereof connected to the rear or trailing ends of the frame members 40 and 41.

The reel 8 is rotatably mounted on the forward or leading ends of the frame members 40 and 41. The illustrated reel 8 is mounted on an axle member 43 having opposite end portions thereof rotatably mounted on the frame members 40 and 41, as in suitable bearings 43'.

It is desirable that the position of the reel 8 be adjustable relative to the sickle bar 3, therefore, the frame members 40 and 41 are telescoping. In the illustrated embodiment, the frame members 40 and 41 are each formed of a leading portion and a trailing portion. Sleeve members 44 and 45 each receive the leading and trailing portions of the frame members 40 and 41 respectively. Suitable fastening members are mounted on the sleeve members 44 and 45 and hold the leading portions of the frame members 40 and 41 in selected positions relative to the trailing portions thereof.

The frame shaft 39 is rotatably supported on the opposite side portions 14 and 15 of the frame or housing 5. Therefore, one end of the frame 38 must be supported to retain the reel 8 in a desired position relative to the sickle bar 3. In the illustrated embodiment, suitable brackets 46 and 47 are mounted on the opposite end portions of an elongated shaft 19' and extend rearwardly from the trailing side 7 of the frame or housing 5. Connection links 48 and 49 extend between the brackets 46 and 47 and opposite end portions of the frame tie member 42. At least one of the links 48 and 49 is adjustable, as by being an extensible member.

In the illustrated structure, an adjustable brace member 50 extends between a bracket 51 on the trailing end of one of the frame members 40 or 41 and a bracket 52 on the trailing side 7 of one of the opposite side portions 14 and 15 of the housing 5. The illustrated adjustable member 50 includes a pair of threaded shafts with a double nut member connecting same together whereby the adjustable member 50 positions and supports the frame 38 and the links 48 and 49 thereby positioning the elongated shaft 19' and the flange 19 thereon. The location or position of the flange 19 determines the location of the connection of one end of the resilient member 20 and the flexible member 21 between the flange 19 and the combine 2.

The position of the frame 38 thereby determines the position of the reel 8. The illustrated reel 8 includes opposed end members or end flanges 53 and 54 mounted on the axle member 43. A plurality of circumferentially spaced arms 55 and 56 are connected to the flanges 53 and 54 respectively and extend radially therefrom. The arms 55 and 56 are arranged in circumferentially spaced pairs and each pair of arms rotatably supports a tine shaft 57 on the free ends thereof. The reel 8 includes a plurality of circumferentially spaced radially positioned web members 58 each connected to a respective pair of arms 55 and 56 and extending therebetween whereby each pair of arms 55 and 56, the shaft 57, and the respective web member 58 defines a unit for supporting the tines 9 thereon.

In the illustrated embodiment, the tine supporting shafts 57 each have a flange 59 extending radially therefrom and each flange 59 has a rib 60 extending laterally therefrom. The pick-up tines 9 are removably mounted on the rib 60. The illustrated tines 9 each include a center portion 61 and a pair of coil portions 62 and 63 at opposite ends of the center portion 61. A rod portion or finger 64 extends from each of the coil portions 62 and 63 and engages vegetation to move same toward the sickle bar 3.

The harvesting attachment 1 includes means operatively connected to the reel 8 and to each of the pick-up tines 9 for retaining the tines 9 in a generally vertical position during rotation of the reel 8. In the illustrated embodiment, a first mounting bracket 65 extends upwardly from the leading end portion of one of the frame members 40 or 41. A second mounting bracket 66 is mounted on and extends from a bearing housing sleeved on one end of the reel axle member 43. It is desirable that the tines 9 have a desired clearance between the blades 11 of the drum 10, the endless conveyor 6, and the sickle bar 3. Therefore, the second mounting bracket 66 has an arcuate slot 66' therein adapted to receive a suitable fastening member extending through the first mounting bracket 65 and effective to hold the brackets 65 and 66 in clamped engagement.

An annular member 67 is mounted on the second mounting bracket 66 for rotation eccentric of the longitudinal axis of the reel 8, as defined by the axle member 43. In the illustrated embodiment, the inner periphery of the annular member 67 has three radially inwardly extending portions each having an aperture therein. A generally triangular shaped connection member 68 has an aperture in each apex thereof and each aperture is alignable with the aperture in a respective one of the radially inwardly extending portions of the annular member 67 so that a suitable fastening member may be mounted therein to connect the connection member 68 to the annular member 67.

The annular member 67 is mounted for rotation eccentric of the longitudinal axis of the reel 8 by an axle portion extending from the connection member 68 and received in a suitable socket on the second mounting bracket 66. If it is desired that the position of the axle portion be adjustable relative to the connection member 68 and thereby relative to the socket on the second mounting bracket 66, then a planar member 69 having the axle portion thereon is adjustably mounted on the connection member 68.

The illustrated means for retaining each of the tines 9 in a generally vertical position during rotation of the reel 8 includes linkage means for each of the tine shafts 57 having the tines 9 mounted thereon for turning the shafts 57 in response to rotation of the reel 8 and the annular member 67. In the illustrated embodiment, a first link 70 of each linkage means has one end thereof connected to the shaft 57 having the tines 9 mounted thereon. A second link 71 of each linkage means has one end thereof connected to the annular member 67 and the other end thereof pivotally connected to the other end of the respective first link 70. The second links 71 each extend radially from the annular member 67 and the annular member 67 is mounted for eccentric rotation relative to the axis of the reel 8 whereby rotation of the annular member 67 effects turning of the shafts 57 having the tines 9 mounted thereon.

The operative components of the harvesting attachment 1 may be driven in any suitable manner. In the illustrated embodiment, a drive shaft 71 of the combine 2 is operatively connected to a sprocket 73 mounted on the combine 2 by an endless chain 74. The drive shaft 29 of the harvesting attachment 1 is driven by rotation of the combine sprocket 73. A mounting member 75 is secured to an end of the combine 2 and rotatably supports first and second sprockets 76 and 77 thereon. One of the first and second sprockets 76 and 77 is adjustably mounted on the mounting member 75. The first and second sprockets 76 and 77 are circumferentially spaced relative to the combine sprocket 73 and an endless chain 78 is in operative engagement with a second sprocket 79 mounted on a shaft having the combine sprocket 73 thereon. The endless chain 78 also extends around the first and second sprockets 76 and 77 on the mounting member 75 and around a drive sprocket 80 mounted on the drive shaft 29 of the harvesting attachment 1. Rotation of the attachment drive shaft 29 is operative to drive the operative components of the harvesting attachment 1.

The endless conveyor 6 is preferably formed of a resilient belt so that tension in the belt and engagement with the sleeve members 30 and 32 on the drive and idler shafts 29 and 31 respectively effects movement of the belt in response to turning of the drive shaft 29.

The drum 10 is rotated in response to rotation of the attachment drive shaft 29. In the illustrated embodiment, a second drive shaft 81 is positioned forwardly of the attachment drive shaft 29 and the shafts 29 and 81 have aligned sprockets 82 and 83 thereon respectively. An endless chain 84 is in engagement with and extends around the sprockets 82 and 83 on the drive shafts 29 and 81 respectively whereby rotation of the drive shaft 29 effects rotation of the second drive shaft 81.

A second sprocket 85 is mounted on the second drive shaft 81 and is longitudinally spaced from the sprocket 83 thereon. An endless chain 86 extends around the second sprocket 85 and around two sprockets 87 and 88 rotatably mounted on the housing 5. The two sprockets 87 and 88 are positioned so that a portion of the endless chain 86 operatively engages a drum drive sprocket 89 mounted on the drum drive shaft 37.

The reel 8 is rotated in response to rotation of the attachment drive shaft 29. In the illustrated embodiment, the drive shaft 29 has a drive pulley 90 mounted thereon. A first power transmission pulley 91 is rotatably mounted on the housing 5, as by being mounted on a rotatably mounted shaft 92. An endless belt 93 extends around the drive pulley 90 and around the first power transmission pulley 91. A belt tensioning pulley 94 may be adjustably mounted on the housing 5 and positioned in engagement with the belt 93.

A second power transmission pulley 95 is mounted on the shaft 92 and is turned therewith. A reel drive pulley 96 is mounted on the rotatably mounted frame shaft 39 which is positioned in the upper portion 12 of the housing 5. An endless belt 98 extends around the second power transmission pulley 95 and the reel drive pulley 96. A belt tensioning pulley 99 may be adjustably mounted on the housing 5 and positioned in engagement with the belt 98.

The shaft 39 is mounted on the frame 38 supporting the reel 8 and has a second reel drive pulley 100 mounted thereon and spaced from the first reel drive pulley 96. The axle 43 of the reel 8 has a pulley 101 thereon. An endless belt 102 extends in a figure eight (8) path around the second reel drive pulley 100 and the pulley 101 on the axle 43. A belt tensioning pulley 103 may be adjustably mounted on the frame 38 as on a suitable bracket 104 and in engagement with the endless belt 102.

A plurality of the harvesting attachments 1 may be mounted on the combine 2 by providing suitable coupling means 105 on facing ends of the attachment drive shafts 29 whereby driving the drive shaft of one harvesting attachment 1 drives the operative component of each of the harvesting attachments.

It is to be understood that while I have illustrated and described one form of my invention, it is not to be limited to the specific form or arrangement of parts herein described and shown.

What I claim and desire to secure by Letters Patent is:

1. A row-crop harvesting attachment for use in combination with a combine having a sickle bar on the forward portion of a trough and a driven auger within said trough and a drive means operatively connected to said sickle bar and auger to drive same and comprising:
   (a) an attachment frame and means for mounting said frame on a forward portion of a combine adjacent to and forwardly of a combine trough, said frame having a leading side and a trailing side, said frame having walls defining a plant passageway extending between the leading side and the trailing side of said frame, said frame walls being arranged to receive vegetation substantially aligned in a row;
   (b) means mounted on said frame and positioned adjacent the leading side of said frame for cutting vegetation;
   (c) means mounted on said frame and positioned above said means for cutting vegetation for moving vegetation toward said vegetation cutting means as the combine moves along a vegetation row;
   (d) an endless conveyor mounted on said frame and extending along the defined passageway from adjacent said vegetation cutting means to adjacent the trailing side of said frame for moving vegetation into the combine trough; and
   (e) drive means on the combine and operatively connected to said vegetation cutting means and to said means for moving vegetation toward said vegetation cutting means and to said endless conveyor for driving same.

2. A row-crop harvesting attachment for use in combination with a combine as set forth in claim 1 wherein:
   (a) said means mounting the attachment frame includes pivot means on a lower portion of the attachment frame adjacent the trailing side thereof and supported on the forward portion of the combine for permitting up and down swinging movement of said attachment frame; and
   (b) resilient means adjustably connecting an upper portion of the attachment frame adjacent the trailing side to the combine for cooperation with said pivot means in supporting the attachment to permit the leading side to travel over uneven ground.

3. A row-crop harvesting attachment as set forth in claim 2 wherein said means for moving vegetation toward said cutting means comprises;
   (a) a reel rotatably mounted on said frame and positioned forwardly of said cutting means, said reel being rotated by said drive means;
   (b) a plurality of circumferentially spaced arms extending radially from said reel;
   (c) a plurality of tines each mounted on a respective one of said arms, said tines each being rotatably mounted on said respective arms; and (d) means operatively connected to said reel and to each of said tines for retaining each of said tines in a generally vertical position during rotation of said reel.

4. A row-crop harvesting attachment as set forth in claim 3 including:
(a) a drum rotatably mounted on said frame and positioned above said endless conveyor and rearwardly of said reel, said drum being rotated by said drive means; and
(b) a plurality of circumferentially spaced vegetation engaging members each extending radially from said drum whereby rotation of said drum assists said endless conveyor in moving vegetation to said combine trough.

5. In combination with a combine having a sickle bar mounted on a forward portion of a trough and having a driven auger within said trough, said combine having drive means operatively connected to said sickle bar and to said auger for driving same, a row-crop harvesting attachment comprising:
(a) an attachment frame and means for mounting same on a forward portion of a trough of a combine, said attachment frame having a leading side and a trailing side, said frame having walls defining a plant passageway extending between the leading side and the trailing side of said frame, said walls being arranged to receive vegetation substantially aligned in a row;
(b) sickle bar means mounted on said attachment frame and positioned adjacent the leading side of said frame for cutting vegetation as the combine moves along a row of vegetation;
(c) means mounted on said attachment frame and positioned above said sickle bar means for moving vegetation toward said sickle bar means;
(d) an endless conveyor mounted on said attachment frame and extending along the defined passageway from adjacent said sickle bar means to adjacent the trailing side of said frame for moving cut vegetation into the trough of the combine; and
(e) attachment drive means operatively connected to the drive means of the combine and to said sickle bar means and to said means for moving vegetation toward said sickle bar means and to said endless conveyor for driving same.

6. In combination with a combine, a row-crop harvesting attachment as set forth in claim 5 wherein:
(a) said means mounting the attachment frame includes pivot means on a lower portion of the attachment frame adjacent the trailing side thereof, said pivot means being supported on a forward portion of the combine forwardly of and adjacent the trough for permitting up and down swinging movement of said attachment frame;
(b) adjustable means including resilient means connecting an upper portion of the attachment frame adjacent the trailing side thereof to the combine for cooperation with said pivot means in supporting the attachment to permit the leading side to travel over uneven ground; and
(c) toe portions pivotally mounted and resiliently supported on the leading side of the walls defining the path therebetween.

7. In combination with a combine, a row-crop harvesting attachment as set forth in claim 6 wherein said means for moving vegetation toward said sickle bar means comprises:
(a) a reel frame pivotally mounted on an upper portion of the attachment frame adjacent said trailing side and extending forwardly therefrom;
(b) a reel rotatably mounted on said reel frame and positioned forwardly of said sickle bar means, said reel being rotated by said attachment drive means;
(c) means adjustably connecting a rear portion of the reel frame to the attachment frame for selectively spacing the reel relative to said sickle bar means;
(d) a plurality of circumferentially spaced arms extending radially from said reel and arranged in pairs;
(e) a plurality of tines each mounted on a respective one of said arms, said tines each being mounted on a respective shaft rotatably mounted on a respective pair of arms; and
(f) means operatively connected to said reel and to each of said tines for retaining each of said tines in a generally vertical position during rotation of said reel.

8. In combination with a combine, a row-crop harvesting attachment as set forth in claim 7 including:
(a) a drum rotatably mounted on said attachment frame and positioned above said endless conveyor and rearwardly of said reel, said drum being rotated by said attachment drive means; and
(b) a plurality of circumferentially spaced vegetation engaging members each extending radially from said drum whereby rotation of said drum assists said endless conveyor in moving vegetation.

9. In combination with a combine, a row-crop harvesting attachment as set forth in claim 8 wherein said means for retaining said tines in a generally vertical position during rotation of said reel includes:
(a) an annular member mounted for rotation eccentric of the axis of said reel; and
(b) linkage means for each of said arms and each extending between said annular member and a respective one of said shafts having said tines mounted thereon for turning said shafts in response to rotation of said reel and said annular member.

* * * * *